July 29, 1969
R. L. ALDER
3,457,654
PENDULUM RELEASE SYSTEM FOR SIGNALLING DRIFT INDICATOR
Filed July 1, 1966
4 Sheets-Sheet 1
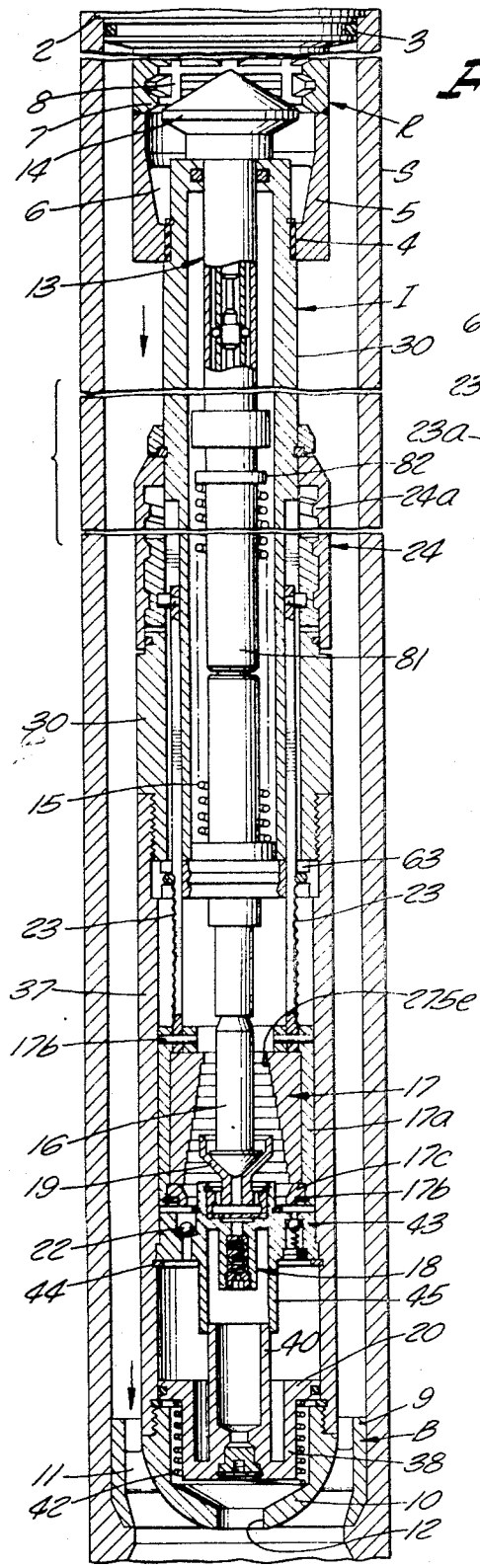
ROBERT L. ALDER
INVENTOR.
BY *C. H. Stallings*
ATTORNEY July 29, 1969 R. L. ALDER 3,457,654
PENDULUM RELEASE SYSTEM FOR SIGNALLING DRIFT INDICATOR
Filed July 1, 1966 4 Sheets-Sheet 2

ROBERT L. ALDER
INVENTOR.

BY *[signature]*

ATTORNEY

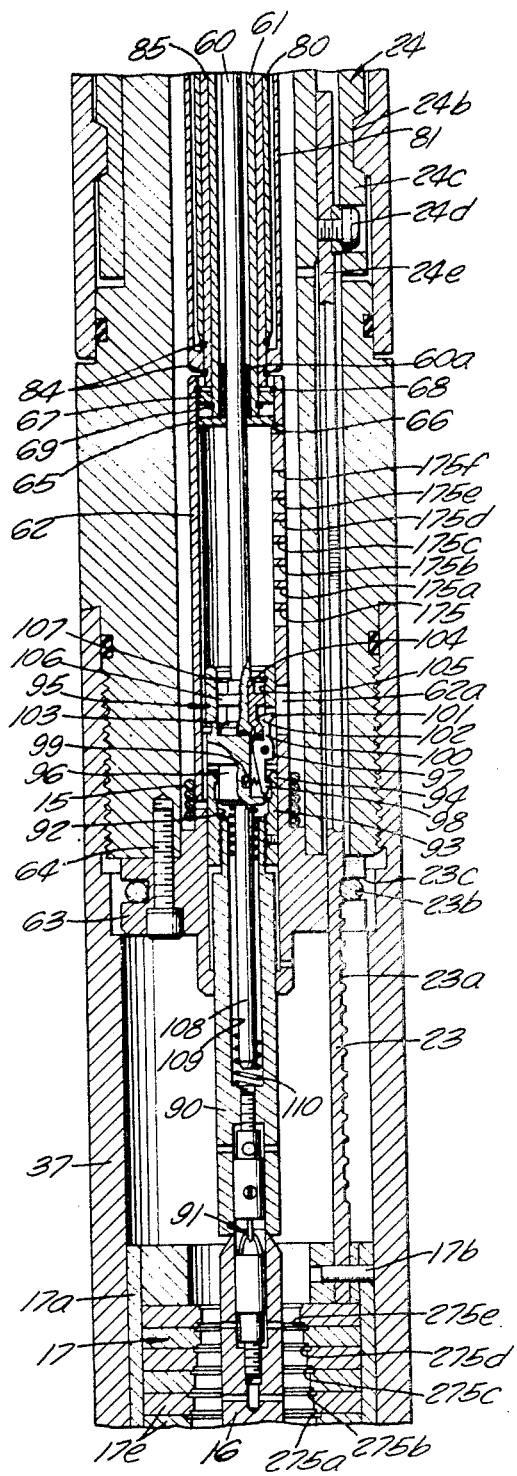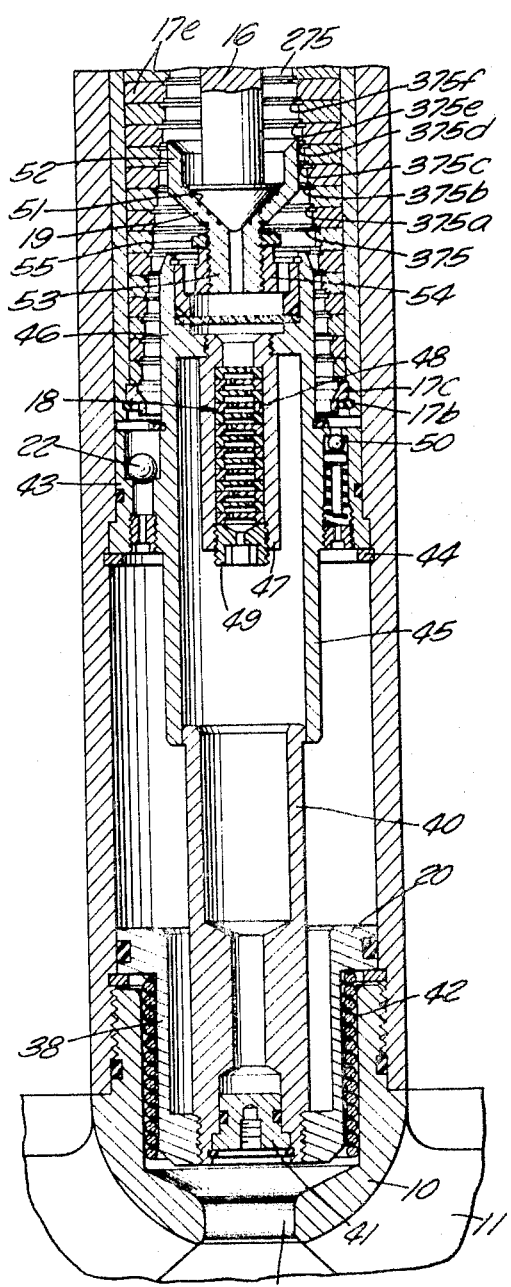
FIG. 2C.
FIG. 2D.
ROBERT L. ALDER
INVENTOR.
ATTORNEY

July 29, 1969    R. L. ALDER    3,457,654
PENDULUM RELEASE SYSTEM FOR SIGNALLING DRIFT INDICATOR
Filed July 1, 1966    4 Sheets-Sheet 4

ROBERT L. ALDER
INVENTOR.

BY C. Y. Stallings

ATTORNEY

United States Patent Office 3,457,654
Patented July 29, 1969

3,457,654
PENDULUM RELEASE SYSTEM FOR
SIGNALLING DRIFT INDICATOR
Robert Lee Alder, Pasadena, Calif., assignor to Byron Jackson, Inc., Long Beach, Calif., a corporation of Delaware
Filed July 1, 1966, Ser. No. 562,146
Int. Cl. E21b 47/024; G01c 9/14
U.S. Cl. 33—205
25 Claims

ABSTRACT OF THE DISCLOSURE

A signalling apparatus for providing a signal at the earth's surface indicative of the angular disposition of a drilling string in a well, the apparatus having a gravity responsive pendulum and cooperative stops therefor, the pendulum being releasable upon engagement with a stop.

---

The present invention relates to signalling drift indicators of the type generally disclosed and claimed in Alder et al. Letters Patent of the United States No. 3,176,407, granted Apr. 6, 1965.

Signalling drift indicators of the type here involved have been sucessfully employed to indicate deviation of oil, gas or other wells from the desired angle as drilling progresses. However, such instruments are subjected to extremely adverse operating conditions while essentially requiring consistent accuracy in order to assure that the well drilling operations may progress efficiently and with knowledge respecting the operating conditions in the well bore.

In general, signalling drift indicators of the type here involved are adapted to be disposed in a drill collar sub above the drill bit of a well drilling string. The instrument includes an elongated housing containing clean oil, and internal pressure is balanced with external pressure by a floating divider at the lower end of the instrument. At the upper end of the housing is a pulse ring attachment through which drilling fluid flows during drilling. Reciprocable in the upper end of the housing is a shaft having a knob which passes upwardly through the pulse rings upon extension of the shaft from the housing and which responsive to flow of drilling fluid will force the shaft downward within the housing. As the knob passes downward through the pulse rings it cooperates with them to provide restrictions to flow. Such movement is retarded so that the successive restrictions cause distinct pressure pulses which will travel through the column of fluid to the earth's surface, where the signals may be recorded. Pendulum means are provided in the housing for limiting shaft extension in accordance with the angle from vertical at which the housing is disposed when the circulation of drilling fluid is halted. Thus, the pressure pulses recorded at the surface are indicative of the angle of the well in the region of the drill string sub in which the instrument housing is installed.

In the above cited patent there is disclosed a coding system including a rod, stop members selectively expandable by the rod, and a stop carried by the shaft and engageable with the expanded stop members. The coding rod is controlled by the pendulum means so that the ultimate travel of the shaft and thus the knob through the pulse rings is directly related to the angle of the instrument. Such an instrument therefore produces a pulse for each increment of the total angle which the instrument may measure.

Experience gained from observation of instrument problems has shown that desirably the pendulum and coding systems of prior instruments should be protected against excessive loading or abuse during shipment and use of the instrument. Therefore, an object of the present invention is to provide a drift indicator having a pendulum release and seating system whereby during shipment the pendulum may remain spring biased into into engagement with a protective seat, and during use the pendulum will also return to its seat after engaging a pendulum stop to cause operation of the pendulum release system.

Another object is to provide a system for arresting movement of the coding rod of the instrument coding means and holding the coding rod in the arrested position as the pendulum returns to a position in its seat, so that the coding system is conditioned to limit upward movement of the instrument shaft to an extent which is directly related to the angle of deviation of the instrument housing from vertical.

Another object is to provide means for adjusting the relationship of the pendulum seat and the pendulum stop means whereby to enhance accurate adjustment of the instrument.

In brief, the present invention resides in a signalling apparatus adapted to be installed in a well drilling string for producing pressure signals in a stream of well drilling fluid indicative of the angular disposition of the drilling string, the apparatus including an elongated housing, a shaft having a free end projecting from an end of the housing, biasing means in the housing for moving the shaft longitudinally outward with respect to the housing, gravity responsive means including a pendulum and stops spaced longitudinally in the housing for limiting movement of the shaft, the free end of the shaft having a surface responsive to the flow of drilling fluid for moving the shaft inward with respect to the housing against the biasing means, pressure pulse producing means for producing the signals during inward movement of the shaft, and means connecting the pendulum to the shaft, the improvement wherein the means connecting the pendulum to the shaft includes means for releasing the pendulum from its connection to the shaft responsive to engagement of the pendulum with one of the stops, and means cooperative with the housing for limiting outward movement of the shaft upon release of the pendulum.

Other objects and advantages of the invention will be hereinafter described or will become apparent to those skilled in the art, and the novel features of the invention will be defined in the appended claims.

In the accompanying drawings:

FIG. 1 is a fragmentary view partly in vertical section and with certain parts shown in elevation, illustrating a drift indicator instrument installed in a drill collar sub, the shaft being in its down position and the pendulum being on its seat;

FIG. 2c is a downward extension of FIG. 2b, showing the lower portion of the angle adjuster, and showing the lower portion of the coding system including the pendulum release means;

FIG. 2d is a downward extension of FIG. 2c, showing the pendulum seat, with the pendulum seated thereon, and showing the lower instrument support and the internal-external pressure balancing divider and the instrument fluid transfer restrictor and bypass;

FIG. 5 is a view taken on the line 5—5 of FIG. 3; and

FIG. 6 is a view taken on the line 6—6 of FIG. 4.

Like reference characters in the several views of the drawings and in the following description designate corresponding parts.

Figure 2A:
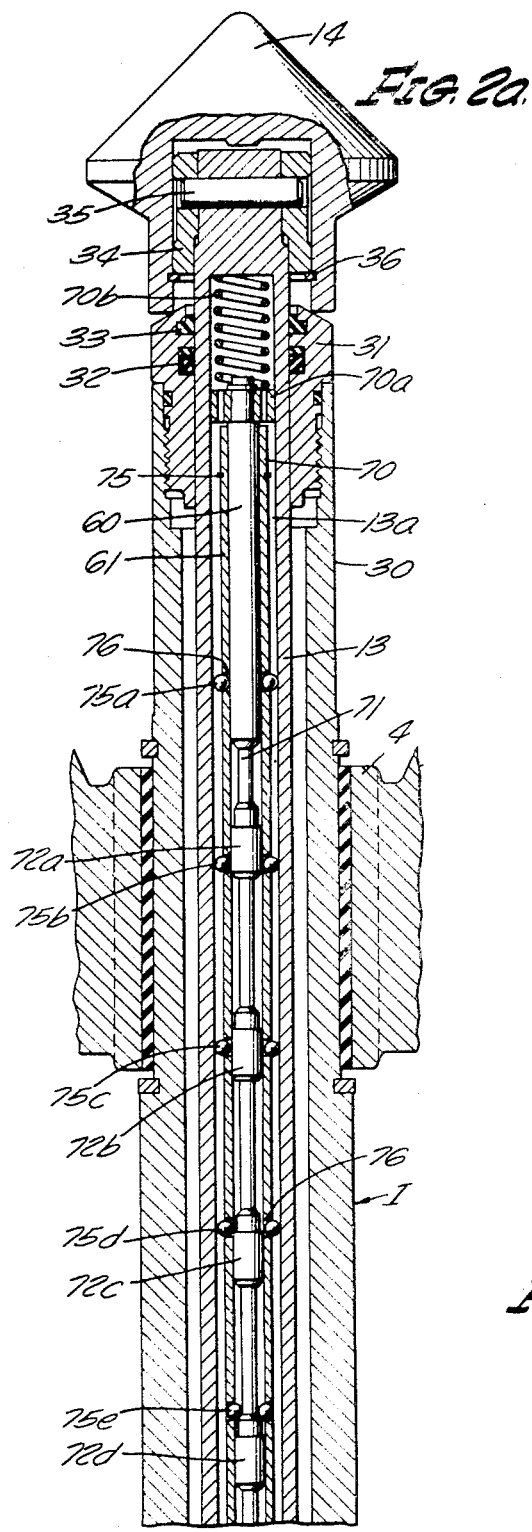
FIG. 2a is an enlarged fragmentary detail view in longitudinal section showing the upper end of the instrument of FIG. 1, minus the pulse ring assembly, and showing the upper portion of the coding system.

Referring to FIG. 1, it will be seen that the drift indicator assembly of the invention is installed in a sub or length of drill collar S which is, as customary, adapted to be mounted in a string of drill pipe so as to conduct drilling fluid downwardly through the drill collar sub S to the bit, not shown, and the fluid then flowing upwardly outside of the drill string to the earth's surface. This assembly comprises an instrument housing generally denoted I having at its upper end a pulse ring sleeve R and at its lower end a bottom support B whereby the housing I is supported top and bottom in the sub S, and drilling fluid may flow through the sub S about the housing I.

In this connection, the pulse ring sleeve R has an enlarged end flange 2 which shoulders and is sealed in a seat 3. At its lower end the sleeve R is preferably provided with an integral cylindrical member 4 connected to the sleeve by arms 5 providing windows or flow passages 6, so that fluid may pass through the sleeve R. This mounting is preferably like that more specifically described in my copending application for United States Letters Patent, Ser. No. 561,637, filed June 29, 1966. Within the sleeve R it is provided with a series of axially spaced pulse rings 7, each of which is adapted to cause a pressure pulse in the fluid stream passing therethrough, as will hereinafter appear. Between the rings are axially extended and angularly spaced ridges 8 forming abutments in the spaces between the ribs. This pulse ring construction is preferably like that more specifically described in my copending application for United States Letters Patent, Ser. No. 552,150, filed May 23, 1966.

Bottom support B has an outer rim 9 and a hub 10 on which the rim 9 is supported by webs 11 forming therebetween flow passages at the lower end of housing I. A port 12 is provided in the hub 10 so that fluid finds access to the housing I at its lower end.

The housing at its upper end has reciprocably mounted thereon and extensible therefrom a shaft 13 having at its outer extremity a head or knob 14. Within housing I is a spring 15 which normally biases shaft 13 upwardly out of the housing I, thereby causing the head 14 to be moved upwardly through the pulse rings 7. However, the flow of drilling fluid downwardly through the pulse ring sleeve R will cause the head 14 to move downwardly into engagement with the upper end of housing I. Thus, during circulation of drilling fluid the shaft 13 and knob 14 will remain as shown in FIG. 1, but when such circulation is halted, the shaft will be forced outward and the head will move upward through the rings 7. Such circulation of drilling fluid is automatically ceased each time an additional length of drill pipe is to be added at the earth's surface, and otherwise as desired. When circulation is resumed, a pressure pulse is caused as the knob 14 passes through the rings 7 due to the restriction in flow area, and such pulses are detectable at the earth's surface by a typical pressure gauge or pressure recorders.

In order that the upward movement of the shaft 13 will be limited in accordance with the angle at which the housing I is disposed, gravity responsive means includinug a pendulum generally denoted at 16 is adapted to selectively engage pendulum stop means 17 as the pendulum moves upwardly. In order to retard downward movement of the shaft 13, so that as previously indicated the result-ant pressure pulses will be distinct and adequately spaced, means generally indicated at 18 are provided for retarding fluid displacement through the pendulum seat 19. At the lower end of the housing I is a divider piston 20 shiftable to balance internal fluid pressure and external drilling fluid pressure and so as to enable the transfer of fluid through the retarding means 18 as the shaft 13 displaces fluid downwardly and the upward transfer of fluid through a check valve 22 as the shaft 16 is urged upwardly.

In order to change the relationship between the stop means 17 and the pendulum 16, means are provided for shifting the stop means axially in housing I. In this connection the stop means 17 is connected by rods 23 to adjuster means 24.

Referring now more particularly to FIGS. 2a through 2d, the details of the structure will be more fully explained.

The instrument housing I includes an upper tubular section 30 having an upper shaft guide 31 threadedly mounted therein. Shaft guide 31 has a seal and wiper means 32 and 33, respectively, engageable with the shaft. At the outer extremity of the shaft, the knob 14 is supported by means of a knob bushing 34, a pin 35 connecting the bushing to the shaft, and a snap ring 36 retaining the knob on the bushing.

As seen in FIG. 2c, the upper housing section 30 is threaded to a lower housing section 37 to the lower end of which is connected the hub 10 of bottom support B, as shown in FIG. 2d. Within the lower housing section is the divider piston 20 which has a skirt 38 adapted to extend into the hub 10. Mounted in the skirt 38 is a hollow piston guide stem 40, at the lower end of which is a filler plug 41, whereby the housing may be filled with clean oil or the like. A spring 42 seated in hub 10 is provided to normally bias the piston 20 upward, but essentially the piston 20 serves to apply pressure to the internal fluid equal to external fluid pressure and to move axially to allow extension of the shaft 13 from the housing.

Disposed above the piston 20 in lower housing section 37 is an orifice block 43, retained in place by a lock ring 44 and having a downwardly extended guide tube 45 slidably receiving the piston guide stem 40 of the piston. Supported by an upwardly extended tubular part 46 on the block 43 and within guide tube 45 is an orifice disc support 47 having therein a stack of orifice discs 48 retained in place by a ported plug 49. At one side of block 43 is an upwardly opening ball check valve 22 and at another location in the block 43 is a downwardly opening spring loaded relief valve 50. Thus, the orifice block, the valve 22 and the orifice discs 48 constitute means for retarding downward flow of housing fluid through the block 43, while enabling comparatively free upward flow of housing fluid, as the shaft is extended from the housing and forced back into the housing during operation of the instrument. The valve 50 serves to relieve pressure in the event that such relief may be necessary.

The block 43 also supports the aforementioned pendulum seat 19. This seat 19 comprises a conical center 51 having an upstanding guide skirt 52. The seat center has a ported stem 53 and means are provided for adjustably supporting the stem 53 and hence the seat 19 within the upper end of block port 46. Such means in the illustrative embodiment comprises a spider 54 in which the stem 53 is threaded and a lock 55 engageable with the spider.

The pendulum 16 as shown in FIG. 2d is adapted to seat in the pendulum seat 19, when, as shown in FIG. 2a, the shaft 13 is in the downward position. The shaft is connected to the pendulum by means which (1) allows upward movement of the shaft a distance inversely related to the upward travel of the pendulum, and (2) by means which, upon the pendulum reaching the upper limit of its travel, will cause release of the pendulum so that it will be freed to return to its seat.

The first mentioned means includes a longitudinally extended coding rod 60 which is reciprocally disposed in a tubular guide and stop ball support. The guide 61 is connected to and essentially constitutes a portion of the upper housing section 30, and, as best seen in FIG. 2c, the guide is supported at its lower end in a coding rod stop tube 62 which is formed as an upward extension of a block 63 which in turn is secured as by fasteners 64 to the lower end of the upper housing section 30. More specifically, the guide 61 seats at its lower end on a washer 65 which shoulders at 66 in the upper end of the tube 62, and in upwardly spaced relation to the washer 65 is a second washer 67 fastened in the tube 62 by lock ring 68, the lower end of the guide 61 extending through washer 67 and having a lock ring 69 which engages beneath the washer 67. Thus it is apparent that while the guide 61 is assembled with the tube 62 prior to connection of block 63 to the lower end of housing section 30, means are provided so that the ultimate assembling of these components results in the guide 61 being rigidly and concentrically supported within the upper housing section 30.

The coding rod 60 previously referred to is composed of an upper end section 70 slidably disposed within the guide 61. Beneath the upper end 70 is an axially spaced series of reduced stem sections 71 and thimbles 72a, 72b, 72c, 72d, 72e and 72f. Beneath the lowermost thimble 72f is a connector 73 which connects the upper coding rod section 70 to a lower coding rod section 74, the latter extending downwardly through the guide 61 and the guide supporting washers 65 and 67 into the coding rod stop tube 62. At its upper end, coding rod section 70 has a centralizing guide 70a secured thereto and slidably engaged in the shaft 13, this guide being perforated to permit bypass of fluid within the instrument. Above the guide 70a is a coil spring 70b freely disposed in shaft 13 so as to engage and bias the coding rod downward when the shaft is in its downward position, as shown in FIG. 2a. As shown in FIGS. 2a and 2c, there is another coil spring 60a which surrounds the lower coding rod section 74 within rod guide 61 and engages at its upper end with connector 73 and at its lower end with the support washer 65 for tube 62. This spring 60a is adapted to normally bias the coding rod 60 upward when the shaft 13 moves upwardly. It is the purpose of the thimbles 72a-72f depending upon the extent of upward movement of the coding rod, as will be more fully explained hereinafter, to selectively hold in an outwardly projected position a set of stop projections which more specifically are composed of sets of balls. In the illustrative embodiment, there are 6 sets of such balls respectively designated from top to bottom as viewed in FIGS. 2a and 2b, 75a, 75b, 75c, 75d, 75e, 75f, adapted to be moved outward by thimbles 72a-72f, respectively. The balls are disposed in openings 76 in the rod guide 61 so that the latter also constitutes a ball support. The sets of balls are cammed outward upon engagement by the respective thimbles 72a-72f into annular space 13a defined by the guide 61 and the shaft 13. Within the shaft 13 (see FIG. 2b) is a stop 77 which defines the bottom of the just-mentioned annular space 13a and essentially this stop forms a portion of the shaft 13 which will limit upward movement of the latter, under the influence of spring 15, upon engagement with one of the sets of stop balls 75a-75f, or upon engagement with a stop ring 75 carried by tube 62 in spaced relation above stop balls 75a, thus selectively limiting upward movement of the knob 14 with respect to the pulse ring section R.

Figure 2B:
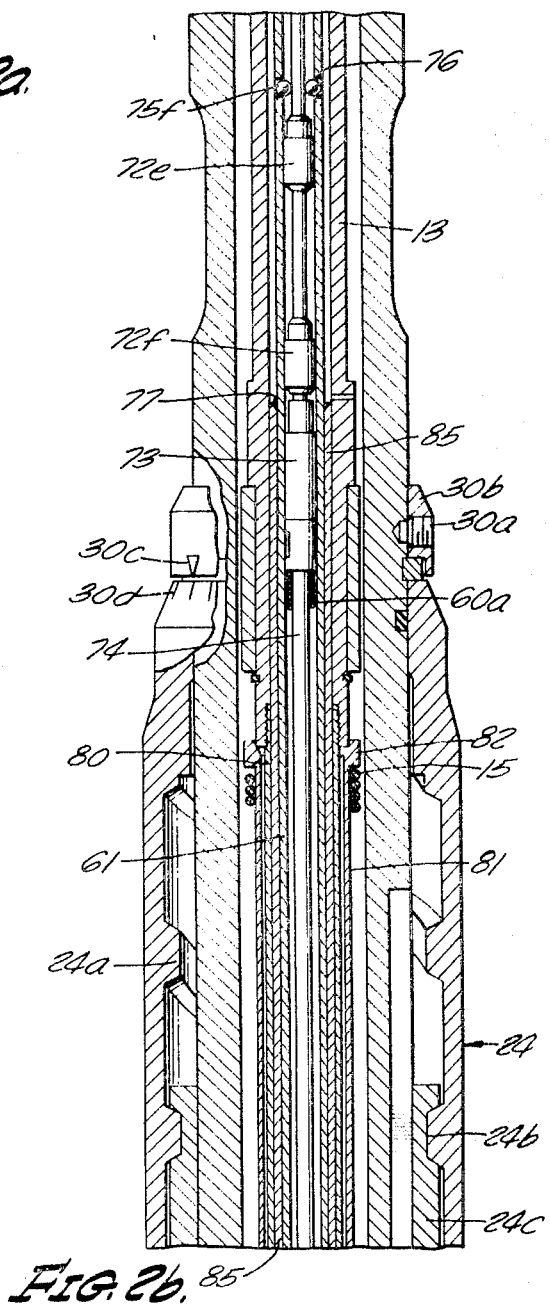
FIG. 2b is a downward extension of FIG. 2a, showing the upper actuating means for the angle adjuster and showing the intermediate portion of the coding system.

Essentially the stop shoulder 77 is a portion of the shaft 13, but in the specifically shown structure the shaft 13 incorporates means for allowing freedom of upward movement of the shaft independently of the stop shoulder 77 in order to relieve the stop shoulder and stop balls from excessive loading in the event of back flow of drilling fluid through the drill collar S as well as during running of the drill string into the well bore following the changing of drill bits. Accordingly, as shown in FIGS. 2b and 2c, the shaft 13 is reduced in diameter at the point of its connection with a downwardly extended shaft extension 80. Concentrically disposed about the downward shaft extension 80 is a spring coupling sleeve 81 having an upper outwardly projecting flange 82 engaged by the upper end of a shaft biasing spring 15. The lower end of the latter abutting, as shown in FIG. 2c, with the block 63. The just-mentioned flange 82 also abuts with the larger diameter upper shaft section so that the shaft 13 is biased upwardly. At its lower end the spring coupling sleeve 81, as seen in FIG. 2c, is connected between a pair of snap rings 84 with an internal sleeve 85 which is disposed within the downward shaft extension 80. Thus it will be seen that the shaft extension 80 is free to move upwardly relative to the spring coupling sleeve 81 and the connected internal sleeve 85, but the spring 15 acts to bias the shaft 13 upwardly through the intermediary of the spring coupling sleeve 81 and internal sleeve 85, the latter having at its upward extremity the above mentioned stop shoulder 77. Therefore, the extent of upward movement of the shaft 13 and the knob 14 under the influence of the spring 15 is limited by the stop 77 even though the shaft may be free to move further upwardly in response to the influence of fluid flow through the drill collar S.

Thus it will be apparent that if the balls 75f be cammed into the path of stop 77, the shaft 13 will be limited in its upward travel under the influence of spring 15 to a position at which the knob 14 is disposed between the lowermost and the next above pulse ring 7. As the shaft 13 is allowed further increments of upward movement then the knob 14 will correspondingly be allowed further upward movement, a distance equal to another pulse ring per increment of shaft movement. Thus if the stop 77 is allowed to pass all the sets of stop balls 75f through 75a but engages stop ring 75, the knob 14 will be allowed to travel a distance equal to the spaces between 7 pulse rings as a result of which downward movement of the knob caused by drilling fluid flow will cause the production of 7 pressure pulses or signals which will travel through the column of drilling fluid to the earth's surface for detection or recordation as an indication of the angle at which the housing 30 is disposed within the well bore. As previously described, the gravity responsive pendulum and the cooperative pendulum stop means 17 serve to limit upward movement of the coding rod 60 so as to cause the projection of the appropriate set of stop balls 75a through 75f to limit upward movement of shaft 13. However as mentioned above in accordance with one of the objectives of the invention, shaft 13 is releasably connected to the pendulum as will now be described and as is more particularly illustrated in FIGS. 2c, 3 and 4.

In prior instruments of the type here involved and more particularly in instruments as specifically shown in the above-identified Alder et al. Letters Patent of the United States No. 3,176,407, the gravity responsive pendulum 16 is directly connected to the coding rod 60. In the present construction, however, the coding rod 60 is releasably connected to the pendulum 16 so that the shaft is also releasably connected to the pendulum.

Slidably disposed within the coding lock tube 62 and within the block 63 is a connecting rod 90, to the lower end of which the pendulum is freely universally connected as by a pair of bails 91. At its upper end the connecting rod 90 is provided with a seat 92 formed within a cup-like female connector member 93 which has at its upper end a latch shoulder 94. Releasably engaged in the seat 92 is a latch mechanism comprising a body 95 having a reduced head 96 disposed in the seat 92 and within the latch shoulder 94 of the latter. Pivotally supported by the body 95 is a dog 97 having a latch finger 98 which is biased by spring 99 outwardly into latching engagement with the shoulder 94. The dog 97 also comprises a stop finger 100 having a laterally outward projecting end 101 which, when the latch finger 98 is engaged with the shoulder 94, as shown in FIG. 2c, is held in a retracted position within a slot in the body 95 in which the dog is pivotally mounted. The finger 100 of the dog also has an inward projection 102 beneath which is engaged an annular flange 103, which is in the illustrative structure provided on a thimble 104 suitably secured to the lower end of the coding rod 60. The thimble 104 is disposed within a bore 105 in the latch body 95 so as to enable limited relative upward movement of the coding rod, such upward movement being limited by a flange 106 on the thimble and a snap ring 107 within the bore of the body. Beneath the body 95 and projecting downwardly from the head 96 is a stem 108. This stem extends into a bore in the connecting rod 90 and is surrounded by a spring 110 seated in the bore 109 and providing a force normally tending to separate the latch body from the connecting rod. The force of the spring 110 combined with the friction of the latching finger 98 with the the latching shoulder 94 provide a holding force which must be overcome by the tendency of the coding rod 60 to move upwardly beyond a point at which upward movement of the connecting rod is arrested. Such a force tending to move the coding rod upwardly is provided by the coding rod actuator spring 60a previously described.

In accordance with the present invention, the coding rod 60 is to be released from the pendulum connecting rod 90 when the coding rod has reached the limit of the desired upward travel, that is, a location at which one or another of the sets of locking balls 75a–75f have been displaced outwardly by thimbles 72a–72f so as to preclude movement of shaft stop 77 upwardly beyond the outwardly projecting stop balls, or when the thimbles are so disposed that none of the stop balls are projected and shaft stop 77 will pass all of the balls and engage stop ring 75. Thus, means are provided to cooperate with the latch mechanism when the connecting rod 90 is released to limit further upward movement of the coding rod 60. In the illustrative embodiment the coding stop tube 62 is provided with a vertically spaced series of stops 175, 175a, 175b, 175c, 175d, 175e, 175f which are respectively adapted to be engaged by the outward projection 101 on the stop finger 100 of the dog 97, when the latter is cammed outwardly by the thimble 104 responsive to further upward movement of the coding rod 60 after upward movement of the latch body 95 has been arrested either by engagement of the pendulum 16 with the pendulum stop means 17 or upon engagement of the latch body 95 with the washer 66 adjacent the top of the coding rod stop tube 62. Stops 175–175f are provided by forming recesses in alignment in the stop tube 62. Means are provided to maintain alignment of the dog 97 with the recesses and such means may comprise a pin 94a on latch member 94 slidable in an elongated keyway 94b in tube 62.

It will be noted that the spacing of axial stop balls 75a–75f relative to the thimbles 72a–72f, as shown in FIGS. 2a and 2b, is such that none of the stop balls will be projected outwardly into the path of shaft stop 77 when the coding rod has traveled upwardly the minimum extent, but the latch ball 75f will be projected outwardly into the path of stop 77 when the coding rod has traveled upwardly to the maximum extent, that is, when the latch body 95 abuts with the washer 65 as previously described. As a result, the shaft will be allowed to move upwardly a minimum extent when balls 75f are projected outwardly and a maximum extent when none of the balls are projected outwardly. This inverse relationship as just described results in a direct relationship between the angle at which the housing is disposed relative to the gravity responsive pendulum when the upward motion of the pendulum is arrested and the extent of upward travel of shaft 13. More particularly, there is a resultant direct relationship between the number of pulse rings through which the knob 14 will pass upwardly and the number of pressure signals produced when the knob is forced downwardly by the flow of drilling fluid and the angle at which the housing I is disposed. Therefore, in respect of each increment of angular deviation there will be produced one pressure signal, and in a manner which will be hereinafter described, the range of angular deviation at which the instrument will respond may be adjusted to that the sensed deviation may be, for example, in increments of ½ degree ranging from 0 to 3½ degrees in the illustrative embodiment or in increments of ½ degree ranging from 3½ degrees to 7 degrees, etc.

Figure 3:
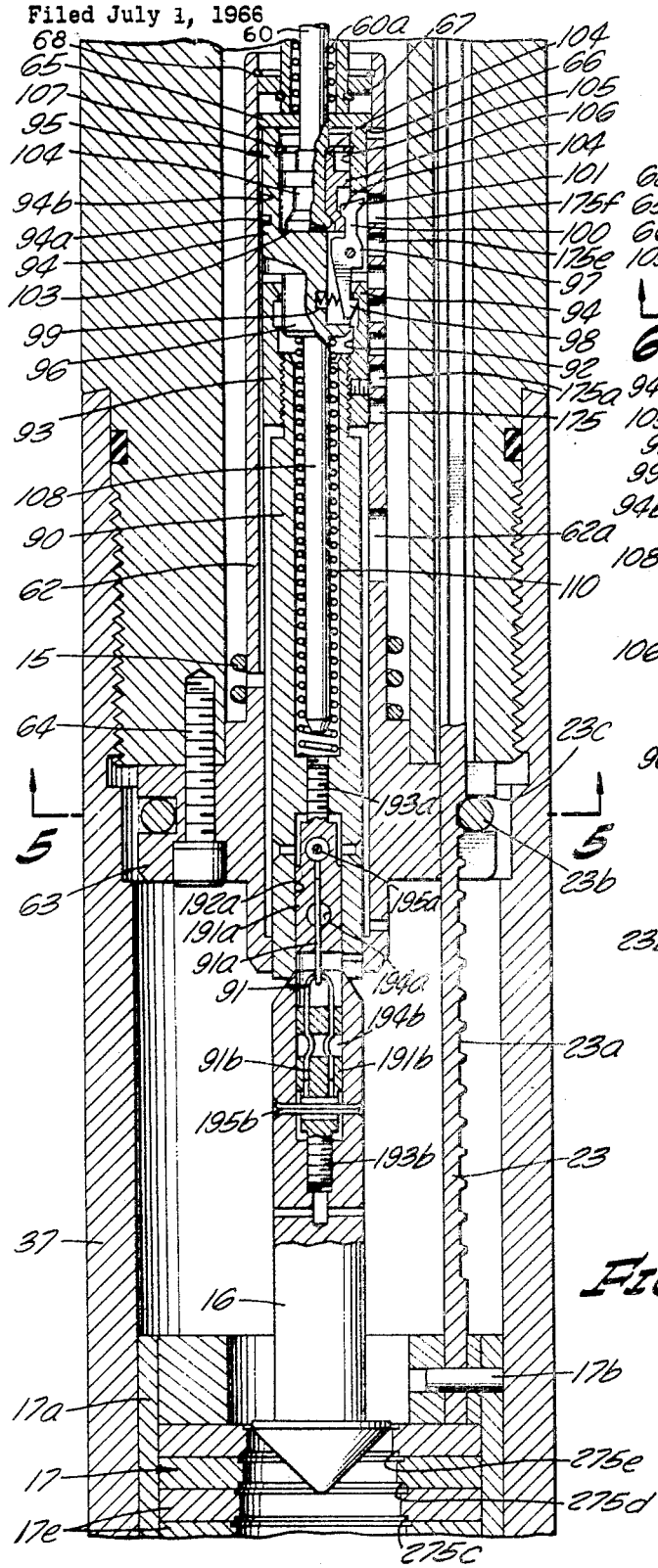
FIG. 3 is an enlarged fragmentary view in vertical section showing the pendulum release system, with the pendulum connecting rod connected to the coding rod and in the extreme upper position just prior to release.
Figure 4:
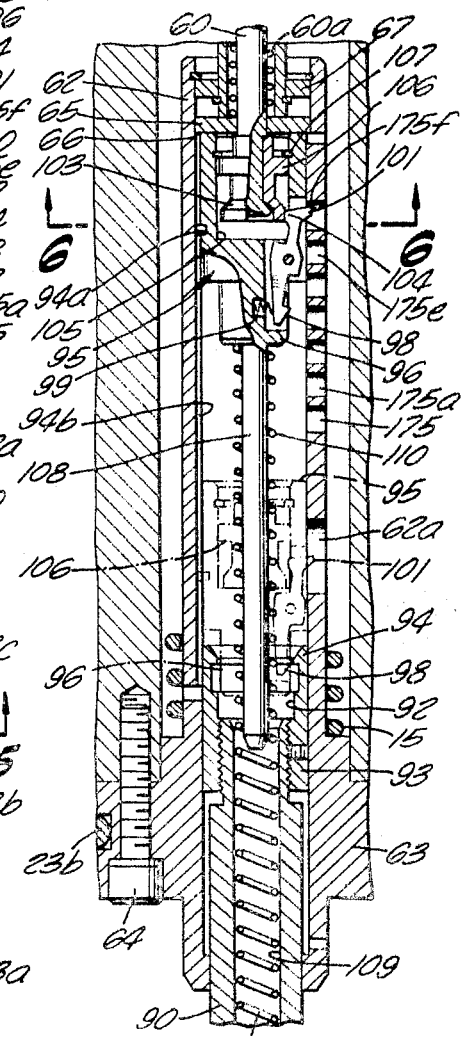
FIG. 4 is a fragmentary view in vertical section corresponding to FIG. 3, but showing the pendulum connecting rod released and urged downward, as compared to FIG. 3, to allow reseating of the pendulum, and showing, in broken lines, the pendulum release means moved downward for reconnection with the connecting rod.

Referring now to FIG. 3, it will be noted that connecting rod 90 and the latch mechanism comprising the member 94 and body 95 have been moved from the position shown in FIG. 2c to the upward permissible limit of travel of the latch body 95, as would occur upon the cessation of the circulation of drilling fluid downwardly through the drill string. Such upward movement it will now be understood will be caused by the force exerted by spring 15 upon the spring coupling sleeve 81 which has caused the shaft 13 to move upwardly and the force applied by spring 60a to move the coding rod 60 upwardly. It will also now be understood that the gravity responsive means comprising the pendulum 16 and the pendulum stop means 17 will permit the illustrated upward movement of the latch body 95 by reason of the fact that the instrument housing I is in essentially a vertical disposition, in the event that the instrument is set to detect angular deviation in the range of 0 to 3½ degrees as just mentioned above. Under these circumstances the upper end of body 95 will abut with washer 65 to limit further upward movement of the interconnected latch body and connecting rod 90. At this point, however, the coding rod biasing spring 60a will cause further upward movement of the coding rod 60. As a result, the flange 103 on thimble 104 will exert an outward camming action on the inward projection 102 of finger 100 on the dog 97. Thus, the latch finger 98 of the dog will be released from the latch shoulder 94 and the outward projection 101 of dog finger 100 will be displaced into the recess 175f. Two things occur under the conditions just described, namely (1) responsive to the release of the latching finger 98 from shoulder 94, spring 110 will bias the connecting rod 90 downwardly from the position shown in FIG. 3 to that shown in FIG. 4, and (2) further upward movement of the coding rod 60 will be prevented by engagement of the outward projection 101 in the recess 175f combined with engagement of flange 106 on thimble 104 with snap ring 107 carried within the bore 105 of the latch body 95. Therefore, in accordance with one of the objectives of the invention, the relationship between the coding rod 60 and the stop shoulder 77 on the shaft is established, and, simultaneously, the connecting rod 90 is released so that the pendulum 16 is permitted to move downwardly into engagement with the seat 19. By virtue of the structure just described which permits the release of the pendulum from the coding rod, the pendulum 16 and stop means 17 hereinafter to be more specifically described are protected against damaging impact loadings and resultant wear which has been found in the operation of conventional instruments to result in inaccurate readings of angular deviation. Furthermore, it will now be understood that the bails 91, in order to enable free pendulum movement, must be comparatively delicate and the release of the pendulum 16 from the coding rod also reduces the load applied to the bails tending to deform the same. The releasing operation just described resulting from engagement of the latch body 95 with washer 65 will also occur in the event that the pendulum 16 is stopped by the stop means 17 at any selected lower location, the significant point being that the upward movement of the latch body 19 is arrested so that a further slight movement upward of the coding rod 60 will effect camming outwardly of the stop finger 100 of the dog 97, and as previously described, the pendulum 16 is adapted to engage the stop means 17 at spaced locations as a function of the deivation of the instrument housing I from vertical.

In any event, following release of the pendulum from the coding rod, resumption of the circulation of drilling fluid downwardly through the drill collar S, which results in downward movement of knob 14 and shaft 13, will cause re-engagement of the releasable latch means so that the connecting rod 90 will again be connected by dog 97 to the latch body 95. Thus, as shown in broken lines in FIG. 4, the coding rod 60 will be moved downwardly to the extent that the thimble 104 in the bore 105 will force the latch body 95 downwardly against spring 110. Under these circumstances, the inward projection 102 of finger 100 of the dog 97 will be freed to move inwardly into the reduced section of thimble 104 lying between the flange 106 and flange 103. As a result, the latch body 95 will be freed for downward movement to the position shown in broken lines in FIG. 4, at which the latch finger 98 will be cammed inwardly by the latch shoulder 94 so that the finger 98 will pass over the shoulder 94 to be re-engaged with the latter. For the purpose of permitting the camming action of shoulder 94 on the latch finger 98, the coding lock tube 62 is provided with elongated slot 62a aligned with recesses 175–175f, into which the outward projection of finger 100 on dog 97 may extend during the just-mentioned camming action. The slot 62a is elongated so as to allow for tolerance in the manufacture of components.

As previously indicated, in accordance with one of the features of the present invention, means are provided for adjusting the bail connection between the connecting rod 90 and pendulum 16, thus as best seen in FIGS. 2c and 3, the bails comprising an upper bail wire 81a and a lower bail wire 91b, each formed to provide a loop co-engaged with the other. The bail 91a is mounted in a support 191a which extends into a bore 192a in the lower end of the connecting rod 90. The support 191a has at its inner end a threaded stem 193a for adjustably positioning the support 191a in the bore 192a. Support 191a is provided with a pair of diametrical openings, one of which is shown at 194a and into which a suitable tool may be inserted so as to deform the bail wire to prevent its removal from the support 191a. The position in which the support 191a is to be fixed may be determined and fixed by insertion of a suitable locking element such as a cotter pin 195a or the like. In a similar fashion, the ball 91b is mounted in the support 191b and the support 191b is provided with openings 194b to enable deformation of the bail to prevent its removal from the support 191b. In addition, this latter support has a threaded end 193b engaged in the pendulum 16 so as to adjust the position of support relative to the pendulum 16. As in the case of support 191a, support 191b may be fixed in adjusted position by a cotter pin 195b which extends through the support 191b. By virtue of this adjustable pendulum supporting structure, the relationship of the pendulum 16 to the connecting rod 90 may be adjusted to maintain a stable but substantially frictionfree universal connection between the connecting rod 90 and the pendulum 16 so that the pendulum 16 may freely swing relative to the connecting rod 90 to any desired angular disposition relative to the stop means 17 and so that upward movement of the pendulum 16 will be arrested at a precise position representative of the angular disposition of the housing I.

It will be noted, as seen in FIGS. 1, 2c and 2d, that the stop means 17 comprises a supporting sleeve 17a connected to the above-described adjuster rods 23 by means of pins 17b. Adjacent the bottom of sleeve 17a is a stop ring retainer 17c held in place by a snap ring 17b. Intermediate the retainer 17c and the upper end of the sleeve 17a is a series of angular stop shoulders of progressively diminishing diameter. Preferably such shoulders are provided on a series of stacked stop rings 17e. In the illustrative embodiment there is an upper stop shoulder 275e provided by the uppermost stop ring 17e and progressing downwardly are stop shoulders 275d, 275c, 275b, 275a and 275 of progressively increasing diameter. Thus, if upper movement of the pendulum 16 is arrested by stop shoulder 275e, outward projection 101 of dog 97 will engage with the stop at 175e in coding rod lock tube 62 and balls 75e will be caused to project into the path of stop shoulder 77 of the shaft 13. The same relationship exists between each of the stop shoulders 275 through 275d, dog stops 175 through 175d and stop ring 75 and balls 75a through 75d so that while the upward travel of the pendulum 16 will be inversely related to the angular deviation of the instrument housing I, the permitted upward travel of the coding rod 60 and hence the permitted upward travel of the shaft 13 will be directly related to the angular deviation of the housing I from a vertical disposition, and a single pressure signal will be induced in the drilling fluid stream for each increment of angular deviation.

As indicated above, the range of angular deviation at which the instrument may respond is adjustable in response to rotation of the housing part 24 relative to the upper housing 30, whereby to axially shift stop ring supporting sleeve 17a relative to the pendulum 16. As seen in FIGS. 2b and 2c, the housing part 24 is provided with an internal thread 24a. This internal thread 24a engages in a helical groove 24b in a connector sleeve 24c disposed within part 24 and and slidably mounted on the upper housing section 30. Referring to FIG. 2c, it will be noted that the sleeve 24c is connected by means of a fastener 24d to a collar 24e from which depend the above noted rods 23 which extend downwardly through block 63 (see FIG. 5) and are connected to the pins 17b.

The angular disposition of the part 24 relative to the upper housing section 30 thus determines the relative axial disposition of the stop rings 17e in the lower housing section 37. In this manner in the extreme lowermost position of axial adjustment, rings 17e will be disposed for engagement of stop shoulders 275 through 275e by the pendulum 16, but in the event that the instrument is to be adjusted for detection of angular deviation ranging between say 3½ and 7 degrees, if shoulders, 275 through 275e represent detection of angles ranging between 0 to 3½ degrees, the part 24 may be adjusted to move the stop shoulders upwardly so that a second set of stop shoulders 375 through 375f may be disposed for engagement by the pendulum 16. It will also be understood that the range of adjustment of the stop shoulders provided by rings 17e may be such that any combination of stop shoulders 275e through 375 may be availed for the purpose of detecting angular deviation within any selected range of the maximum range for which the instrument is adapted by provision of stop rings 17e of different diameters.

In order to fix the selected range, the rods 23 are provided with a series of axially spaced depressions 23a with which engage detent means 23b which, in the illustrative embodiment, comprises a spring ring disposed about the block 63 in a groove 23c, as best seen in FIG. 5. On the upper housing section 30 is fixed as by fastener 30a a collar 30b having a suitable index means 30c which, in relation to graduations 30d on the upper end of the rotatable part 24, will serve to indicate the relative axial disposition of the stop ring support sleeve 17a within the lower housing section 37. By virtue of this construction, the instrument may be preset so as to detect angular deviation ranging from 0 degree deviation through any selected range of the entire capability of the instrument. For example, either from 0 to 3½ degrees or 2 degrees to 5½ degrees, etc.

In use, the instrument as described above operates so as to indicate to the person controlling the progression of a well drilling operation the angle at which the drill collar string immediately above the drill bit is disposed each time the driller stops the drilling operation so that an additional length of drill pipe may be added to the drill string. This indication is derived inherently due to the fact that the crculation of drilling fluid is temporarily arrested. During the period that such circulation is halted, the shaft 13 and the knob 14 will move upwardly through a number of pulse rings representative of the angular disposition of the drill collar S above the drill bit. In addition, if the driller so desires he may intermittently halt the circulation of drilling fluid so as to derive, at will, an indication of the angular disposition of the drill string above the drill bit.

Upward movement of the knob 14 is limited by engagement of the shaft stop 77 with the stop ring 75 on tube 62 or with one of the sets of balls 75a through 75f, depending upon which of the stop shoulders of the stop means 17 has been engaged by the pendulum 16. Therefore, upon resuption of the circulation of drilling fluid the knob 14 will move downwardly through a number of the pulse rings 7 representative of the increments of angular deviation, so that pressure signals will be induced in the stream of drilling fluid to be detected by surface pressure gauge or surface pressure recorder means to indicate to the driller the angular disposition of the drill string above the drill bit. At the point in this operation at which the circulation of drilling fluid is arrested and the upward movement of the shaft 13 is arrested by engagement of the stop shoulder 77 with the selected balls 75a through 75f, the latch means will be released to allow the pendulum to return to its seat, but upon resumption of circulation of drilling fluid the downward movement of the shaft 13 and the resultant downward movement of the coding rod 60 will cause the latch means to again be engaged with the pendulum connecting rod 90 and the instrument will be conditioned for a subsequent detection of angular deviation.

In conventional instruments of the general type here involved, the foregoing operations impose substantial loads on the universal connection between the pendulum and the coding rod and, in accordance with the present invention, the releasable connection between the coding rod and the pendulum eliminate the adverse effects of such loading of the universal connection. In addition, it will be appreciated from the foregoing that the relative adjustment of the components of the pendulum, the coding rod and the pendulum seat are relatively critical, and the present invention provides for relative adjustment of these components so as to enable compensation for manufacturing tolerances, with the result that the instrument is rendered more accurate in its detection of angular deviation, and the proper seating of the pendulum in its seat each time it is released is assured.

While the specific details of an illustrative embodiment of the invention have been herein shown and described, changes and alterations may be resorted to without departing from the spirit of the invention.

I claim:

1. In a signalling apparatus adapted to be installed in a well drilling string for producing pressure signals in a stream of well drilling fluid indicative of the angular disposition of the drilling string, said apparatus comprising: an elongated housing, a shaft having a free end projecting from an end of said housing, biasing means in said housing for moving said shaft longitudinally outward with respect to said housing, gravity responsive means including a pendulum and stops spaced longitudinally in said housing for limiting such movement of said shaft, said free end of said shaft having a surface responsive to the flow of drilling fluid for moving said shaft inward with respect to said housing against said biasing means, pressure pulse producing means for producing said signals during inward movement of said shaft, and means connecting said pendulum to said shaft, the improvement wherein said means connecting said pendulum to said shaft comprises means for releasing said pendulum from its connection to said shaft responsive to engagement of said pendulum with one of said stops, and means cooperative with said housing for limiting outward movement of said shaft upon release of said pendulum.

2. Signalling apparatus as defined in claim 1, wherein said means for releasing said pendulum comprises a member connected to said pendulum and a member connected to said shaft, a shoulder on one of said members, a latch carried by the other of said members and engageable with said shoulder, and means for disengaging said latch from said shoulder.

3. Signalling apparatus as defined in claim 2, wherein said means for limiting outward movement of said shaft comprises cooperable stop means, one on said latch and the other carried by said housing, for limiting outward movement of said shaft upon disengagement of said latch from said shoulder.

4. Signalling apparatus as defined in claim 1, wherein said means for limiting outward movement of said shaft comprise a stop means fixed with respect to the housing and means engageable with said stop means upon release of said pendulum from said shaft.

5. Signalling apparatus as defined in claim 1, wherein said means for limiting outward movement of said shaft includes coding means for limiting said movement in inverse relation to the extent of movement of said pendulum relative to said stops.

6. Signalling apparatus as defined in claim 5, wherein said coding means includes a coding rod, and a plurality of axially spaced stop means cooperative with said shaft and said coding rod for limiting said outward movement of said shaft in said inverse relation.

7. Signalling apparatus as defined in claim 6, wherein said means for releasing said pendulum includes means releasably connecting said coding rod to said pendulum.

8. Signalling apparatus as defined in claim 1, wherein said housing contains a seat for said pendulum, and including means for biasing said pendulum into engagement with said seat upon release of said pendulum.

9. Signalling apparatus as defined in claim 1, wherein said stops comprise annular shoulders of progressively larger diameter concentrically disposed relative to said housing, said housing containing a seat for said pendulum concentrically disposed relative to said stop shoulders, and including means for adjusting the relative axial spacing between said stop shoulders and said seat.

10. Signalling apparatus as defined in claim 9, wherein said means for adjusting comprises actuator means carried by said housing and connected to said stop shoulders for moving the latter axially relative to said housing.

11. Signalling apparatus as defined in claim 9, wherein said means for adjusting comprises means mounting said pendulum seat for axial adjustment in said housing.

12. Signalling apparatus as defined in claim 1, wherein said housing contains a seat for said pendulum, said seat having an annular skirt and a base within said skirt, said pendulum having an end engageable with said base within said skirt, and including means supporting said seat for axial adjustment relative to said housing.

13. In a signalling apparatus adapted to be installed in a well drilling string for producing pressure signals in a stream of well drilling fluid indicative of the angular disposititon of the drilling string, said apparatus comprising: an elongated housing, a hollow shaft projecting from the top of said housing, spring means in said housing for biasing said shaft upward relative to said housing, said shaft having a surface responsive to the downward flow of well drilling fluid for moving said shaft downward, gravity responsive means including a pendulum and axially spaced stops in said housing, coding means including a coding rod connected to said pendulum and axially spaced stops operable by said coding rod to limit upward movement of said shaft to a distance inversely related to the angle of said housing when said shaft moves upward, the improvement wherein releasable connector means are provided for releasing said pendulum from said coding rod when upward movement of said pendulum is stopped, and means are provided for stopping movement of said coding rod when said pendulum is released.

14. Signalling apparatus as defined in claim 13, wherein said connector means comprises a connector rod on said pendulum, a connector body carried by one of said rods, the other of said rods being provided with a part complemental to said connector body, latch means operable to connect said connector body and said part, and means for releasing said latch means when upward movement of said connector rod is stopped.

15. Signalling apparatus as defined in claim 14, including a seat for said pendulum, and means for biasing said pendulum into engagement with said seat upon release of said latch means.

16. Signalling apparatus as defined in claim 14, including means for stopping upward movement of said coding rod upon release of said latch means.

17. Signalling apparatus as defined in claim 14, including a coding member in said housing having axially spaced coding stops, said releasable latch means including means engageable with one of said coding stops upon release of said pendulum.

18. Signalling apparatus as defined in claim 14, wherein said latch means includes a latch dog and a latch shoulder engageable with said dog, means biasing said dog into engagement with said shoulder, means for moving said dog away from said shoulder when upward movement of said pendulum is stopped, and means on said dog and fixed with respect to said housing for stopping upward movement of said coding rod upon movement of said dog away from said shoulder.

19. Signalling apparatus as defined in claim 13, wherein said connector means comprises a connector rod on said pendulum, a bore in said connector rod, a connector body having a part engageable in said bore, a latch dog pivotally carried by said connector body and having a latch arm, a shoulder on said connector rod in said bore, means for biasing said latch arm into engagement with said shoulder, a stop arm on said dog, a coding tube disposed about said connector body and having stops spaced axially thereof, and means connecting said coding rod to said connector body including means for pivoting said dog to release said latch arm and engage said stop arm with one of said coding stops when upward movement of said pendulum is stopped.

20. Signalling apparatus as defined in claim 19, wherein said means connecting said coding rod to said connector body includes means for enabling slight relative axial movement of said coding rod and said connector body, and cam means for forcing said stop arm outward upon such slight relative movement in one direction.

21. Signalling apparatus as defined in claim 19, including means for enabling automatic reengagement of said latch arm with said shoulder upon downward movement of said coding rod.

22. Signalling apparatus as defined in claim 13, wherein said connector means comprises a connector rod on said pendulum, a connector body carried by one of said rods, the other of said rods being provided with a part complemental to said connector body, latch means operable to connect said connector body and said part, means for releasing said latch means when upward movement of said connector rod is stopped, and means adjustably connecting said pendulum to said connecting rod.

23. Signalling apparatus as defined in claim 22, wherein said last-mentioned means comprises a bail carried by said connector rod, a bail carried by said pendulum, said bails being interengaged, and means for adjusting at least one of said bails axially.

24. Signalling apparatus as defined in claim 1, wherein said means connecting said pendulum to said shaft includes: a connecting rod, and means interconnecting said pendulum and connecting rod comprising a bail carried by said pendulum, a bail carried by said connecting rod, said bails being interengaged, and means for adjusting at least one of said bails axially relative to its carrier.

25. Apparatus as defined in claim 24, wherein said means for adjusting at least one of said bails comprises a threaded stem, said stem having a pair of axial holes, said bail having ends disposed in said holes, said stem having a transverse opening intersecting said holes, said bail ends being deformed in said transverse opening, said stem having a second transverse opening and means removably engaged in said latter opening to prevent rotation of said stem.

References Cited

UNITED STATES PATENTS 3,176,407   4/1965   Alder et al.

LEONARD FORMAN, Primary Examiner

F. J. D'AMBROSIO, Assistant Examiner

U.S. Cl. X.R.

175—45

UNITED STATES PATENT OFFICE
CERTIFICATE OF CORRECTION

Patent No. 3,457,654     Dated July 29, 1969

Inventor(s) Robert L. Alder

It is certified that error appears in the above-identified patent and that said Letters Patent are hereby corrected as shown below:

Column 2, line 6, cancel "into".
Column 5, line 3, after "support" should be --61--.
Column 7, line 20, cancel "the" (second occurrence).
Column 8, line 7, "to" should be --so--.
Column 9, line 1, "deivation" should be --deviation--; li 32, "81a" should be --91a--; line 45, "ball" should be --bail-
Column 10, line 26, cancel "and" (second occurrence).
Column 11, line 1, "crculation" should be --circulation-- line 15, "resuption" should be --resumption--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents